UNITED STATES PATENT OFFICE 2,534,285

PRODUCTION OF PYRIDINE DERIVATIVES

John E. Mahan, Bartlesville, Okla., assignor to Phillips Petroleum Company, a corporation of Delaware No Drawing. Application March 7, 1946, Serial No. 652,781

1 Claim. (Cl. 260—290)

This invention relates to a process for the production of pyridine derivatives containing an

 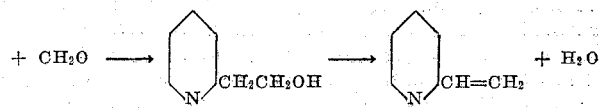

alkenyl group attached to a carbon atom in the pyridine nucleus. In one of its more specific aspects, it relates to a process for the production of vinylpyridines, substituted vinylpyridines, and homologues of these compounds. It is particularly applicable to the production of 2-vinylpyridine and 4-vinylpyridine.

Pyridine derivatives containing an alkenyl

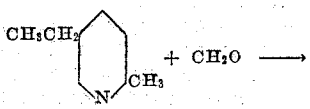

group attached to a carbon atom in the pyridine nucleus would find wide application if readily available. Vinylpyridines, substituted vinylpyridines, and homologues of these compounds are potentially valuable as comonomers with other unsaturated polymerizable organic compounds. Important among these are their uses as comonomers in polymerization processes. In the particular case of 2-vinylpyridine, its copolymer with butadiene has shown definite promise in the field of synthetic rubber operations. The extension of its use in this important field demands a process for the quantity production of 2-vinylpyridine by an efficient and economical process. Other potential uses for these compounds include the production of high molecular weight polymers and copolymers of a resinous nature, compounds which might serve as plasticizers and the like.

Vinylpyridines and their homologues, and in particular 2-vinyl- and 4-vinylpyridine, also have potential uses in the production of nitrogen-containing pharmaceuticals, as intermediates in the synthesis of organic dyestuffs, as bases for the production of useful organic chemicals, and other uses which will be apparent to one skilled in the art.

The production of 2-vinylpyridine by condensation of formaldehyde and 2-picoline to form monomethyl-2-picoline and subsequent dehydration of this product has long been known and practiced in the art. The reaction proceeds in the following manner:

Homologues of vinylpyridines, e. g. alkyl substituted vinylpyridines, may be produced in a similar manner. As an example, 2-methyl-5-ethylpyridine may be converted to 2-vinyl-5-ethylpyridine by formation of the monomethylol derivatives and subsequent dehydration to 2-vinyl-5-ethylpyridine. This reaction proceeds as follows:

Other homologues of vinylpyridine may be produced in an analogous manner.

While it is known that monomethylol picoline and some of its homologues may be noncatalytically dehydrated to the corresponding vinyl compound, the reaction is accompanied by polymerization of the vinyl compounds thereby forming undesirable polymers. The polymerization reaction proceeds to such an extent that the major portion of the vinyl compound is obtained as polymer.

The present invention provides an improved process for the dehydration of pyridine derivatives containing a hydroxy alkyl group attached to a carbon atom in the pyridine nucleus, as exemplified by the foregoing reactions, to produce vinylpyridine, substituted vinylpyridine, homologues of these compounds, and other pyridine derivatives containing one or more alkenyl groups. The pyridine derivatives employed in and produced by the process may also contain chloro or cyano substituents, or both, attached to a carbon atom in the pyridine nucleus. The present invention is particularly applicable to the dehydration of monomethylol-2-picoline to 2-vinylpyridine and monomethylol-4-picoline to 4-vinylpyridine. By the process of the present invention the dehydration may be carried out to produce the vinyl or other alkenyl compound with very little polymerization taking place. In my copending patent application, Serial No. 652,782, filed March 7, 1946, is disclosed an improved process for the reaction of formaldehyde with alkylpyridines. These discoveries have resulted in greatly improving the yields of alkenylpyridine derivatives.

An object of this invention is to provide a process for the production of pyridine derivatives containing an alkenyl group attached to a carbon atom in the pyridine nucleus. Another object of this invention is to provide a process for the production of vinylpyridines and their homologues. Another object is to provide a process for selective production of 2-vinylpyridine, 4-vinylpyridine and their homologues. A specific object is to provide a method for the production of 2-vinylpyridine in good yield from monomethylol-2-picoline. A further object is to provide a novel catalytic process for carrying out the dehydration of monomethylol-picoline and its homologues to form the corresponding vinyl compounds. Another specific object is to provide a process for the catalytic dehydration of monomethylol-2-picoline to produce a 2-vinylpyridine as the principal product of the process.

I have discovered a novel process for the vapor phase dehydration of pyridine derivatives containing a hydroxyalkyl group of from 2 to 6 carbon atoms attached to a carbon atom in the pyridine nucleus to produce the corresponding pyridine derivatives containing an alkenyl group. My novel process is carried out by vapor phase dehydration over catalysts which I have found particularly effective for this reaction. By the process of my invention the formation of resins and other undesirable materials is substantially eliminated.

The process of the present invention has the advantage of a high degree of conversion per pass and high ultimate yield. With the dehydration of monomethylol-2-picoline to 2-vinylpyridine by the process of my invention with recycling of unchanged monomethylol-2-picoline, ultimate yields of 90 per cent or more, based on the theoretical, may be obtained. The process is adapted to smooth continuous operation without interference from resinous by-products.

Pyridine derivatives containing a chloro or cyano group as a substituent on a carbon atom in the pyridine nucleus are often desirable. Representative of the compounds which may be employed as feed for the process of my invention are the monomethylolpicolines, monomethylollutidine, dimethylollutidine, mono-, di-, and trimethylolcollidine, homologues and chloro and cyano substituted homologues of these compounds. Compounds which are suited as feed for the present process may be represented by the following structural formula:

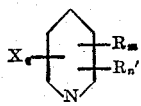

wherein R is a member of the class of hydrogen and alkyl radicals of from 1 to 6 carbon atoms, R' represents a hydroxyalkyl group containing from 2 to 6 carbon atoms, X is a member of the class of chloro and cyano radicals, $m$ is an integer from 0 to 4, $n$ is an integer from 1 to 3 and $q$ is an integer from 0 to 4. It is evident that the sum of $m$, $n$, and $q$ is equal to 5. The preferred compounds used as feed in the present process are monomethylol-2-picoline and its homologues represented by the following structural formula:

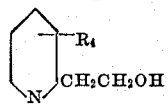

wherein R is a member of the class consisting of hydrogen and alkyl radicals having from 1 to 6 carbon atoms. In the above structural formula the 4R substituents may be part hydrogen and part alkyl radicals.

In accordance with the present invention the hydroxyalkyl derivative of pyridine or a homologue is passed in vapor phase at an elevated temperature into contact with a catalyst. Catalysts which are effective for the dehydration of the hydroxyalkyl group in these compounds are the dehydrating metal oxides which comprise alumina, bauxite, silica gel, synthetic silica-alumina gel, fuller's earth, e. g. floridan earth, Attapulgus clay, and the like. Other dehydrating metal oxides may be used, e. g. oxides of thorium, tungsten, vanadium and molybdenum, but are not commercially economical. Particularly advantageous results are obtained by the use of aluminum oxide in pellet form.

Contact time may be from one-half second to five seconds and the rate of flow one-half to four liquid volumes per volume of catalyst per hour.

Temperatures in the catalyst zone may be within the range of 400° F. to 800° F. or higher, depending upon the activity of the catalyst. In general, best results are obtained by operating at a temperature within the range of from about 500° F. to about 650° F.

A pressure within the range of from about 10 mm. of mercury absolute to about atmospheric is preferred. Best results are obtained at pressures below about 500 mm. of mercury absolute.

In a specific embodiment of the present invention, monomethylol-2-picoline is preheated to a temperature within the range of from about 500° F. to about 650° F. and passed at subatmospheric pressure into contact with aluminum oxide as catalyst. The catalyst effluent is condensed. The condensate separates into two layers, a hydrocarbon layer and a water layer. The hydrocarbon layer is fractionally distilled under reduced pressure into two fractions. Water and 2-vinylpyridine make up the lighter fraction. The heavier fraction, monomethylol-2-picoline, is recycled to the catalyst.

*Example*

Monomethylol-2-picoline was distilled and the vapor passed through a catalyst chamber at the rate of 1.2 liquid volumes per volume of catalyst per hour. The contact time was four seconds and the run continued for 45 minutes. Aluminum oxide in the form of one-eighth inch pellets was used as a catalyst. A layer of glass beads was placed above the aluminum oxide for preheating. The temperature of the catalyst chamber was maintained at 550° to 620° F. by an electric tube furnace. Pressure was held at 10 mm. throughout the system. Effluent gases were received in a water cooled condenser and the condensate extracted with ether. The ether solution was dried over anhydrous magnesium sulfate, the ether removed and the products fractionated at a pressure of 10 mm. A 72.5 per cent yield of 2-vinylpyridine was obtained on the first pass and by recycling of recovered monomethylol-2-picoline an ultimate yield of 84 per cent was realized.

I claim:

A process for the production of 2-vinylpyridine which comprises contacting monomethylol-2-picoline in vapor phase with an aluminum oxide dehydration catalyst at a pressure below 500 mm. Hg and at a temperature within the range of 500 to 650° F. for a contact time within the range of one-half to five seconds, and recovering resulting 2-vinylpyridine.

JOHN E. MAHAN.

REFERENCES CITED

The following references are of record in the file of this patent:

UNITED STATES PATENTS

| Number | Name | Date |
|---|---|---|
| 2,141,611 | Malishev | Dec. 27, 1938 |
| 2,399,395 | Shriver | Apr. 30, 1946 |

FOREIGN PATENTS

| Number | Country | Date |
|---|---|---|
| 338,262 | Great Britain | 1930 |

OTHER REFERENCES

Berichte, vol. 20 (1887), page 164.

Maier: "Das pyridine und seines derivatives," pages 31, 43, 200 and 58.

Sedgwick: "Organic Chemistry of Nitrogen," by Taylor and Baker, 1942, pages 516 and 517.

Certificate of Correction

Patent No. 2,534,285                                  December 19, 1950

JOHN E. MAHAN

It is hereby certified that error appears in the printed specification of the above numbered patent requiring correction as follows:

Column 1, line 49, for "monomethyl-2-picoline" read *monomethylol-2-picoline*;

and that the said Letters Patent should be read as corrected above, so that the same may conform to the record of the case in the Patent Office.

Signed and sealed this 5th day of June, A. D. 1951.

[SEAL]

THOMAS F. MURPHY,
*Assistant Commissioner of Patents.*